United States Patent [19]
Sinders

[11] Patent Number: 6,042,261
[45] Date of Patent: Mar. 28, 2000

[54] METHOD AND APPARATUS FOR APPLYING A PLURAL COMPONENT PUTTY-LIKE ADHESIVE

[75] Inventor: Steven R. Sinders, Moorrsville, Ind.

[73] Assignee: Glas-Craft, Inc., Indianapolis, Ind.

[21] Appl. No.: 09/014,223

[22] Filed: Jan. 27, 1998

[51] Int. Cl.[7] ............................... B01F 3/10; B01F 5/06
[52] U.S. Cl. ................... 366/96; 366/76.6; 366/181.6; 366/336
[58] Field of Search .......................... 366/96, 76.6, 138, 366/340, 336, 191, 162.1, 152.1, 152.2, 152.3, 181.6, 182.4

[56] References Cited

U.S. PATENT DOCUMENTS

| | | |
|---|---|---|
| 3,929,318 | 12/1975 | Saidla . |
| 4,168,018 | 9/1979 | Zahaykevich . |
| 5,372,283 | 12/1994 | Schmitkons et al. . |
| 5,597,236 | 1/1997 | Fasano . |

*Primary Examiner*—Matthew O. Savage
*Assistant Examiner*—Michael Fleming
*Attorney, Agent, or Firm*—Brinks Hofer Gilson & Lione

[57] ABSTRACT

Apparatus for and method of improving mixing of a plural component putty-like material is disclosed. The invention includes an applicator having a plurality of first component channels for flowing a first, highly viscous component, and a central channel communicating with a plurality of transverse channels for flowing a second, lower viscous component into conjoined flow paths with the first component.

14 Claims, 3 Drawing Sheets

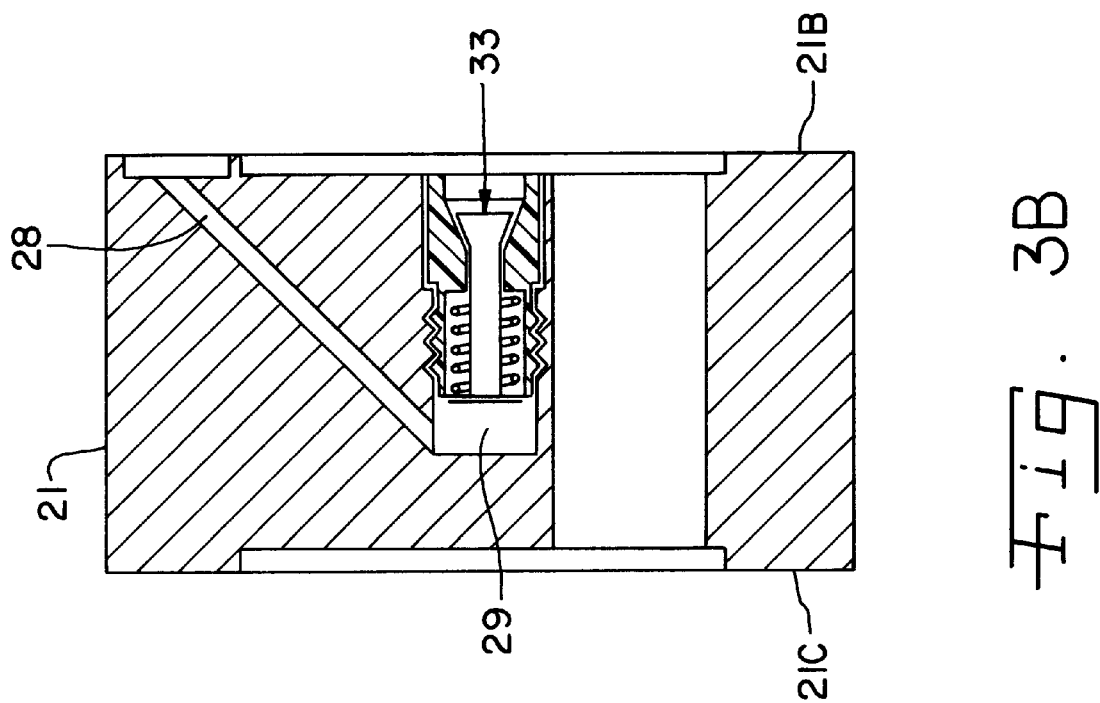
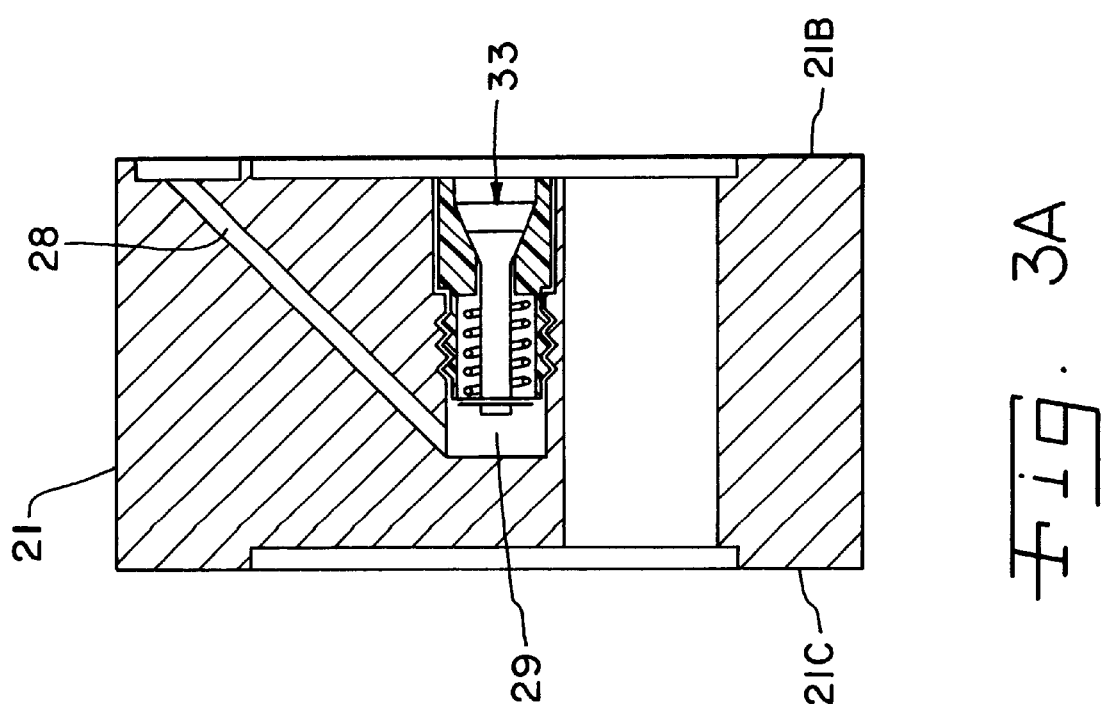

METHOD AND APPARATUS FOR APPLYING A PLURAL COMPONENT PUTTY-LIKE ADHESIVE

FIELD OF THE INVENTION

This invention relates to methods and appartus for applying plural component putty-like materials that must be mixed for application.

BACKGROUND OF THE INVENTION

In the manufacture of articles and apparatus, particularly articles and apparatus including parts and subassemblies including plastic portions, for example, in the manufacture of boats from plastic parts such as glass fiber-reinforced polyester parts manufactured by spray up, and parts manufactured by resin transfer molding, adhesives are frequently used to hold, or to assist in holding the parts and subassemblies together. In the manufacture of such articles, particularly as in the manufacture of boats, it is desirable to use filler-like adhesives to fill voids and to hold adjacent parts together. In such applications, the adhesives frequently used include two components, the first component comprising a heavy putty-like material having a viscosity of 500,000 centipoise and greater, and the second component comprising a very fluid catalyst conventionally having a viscosity of about 200 centipoise. Such two component adhesives, when properly mixed and set, provide reasonable adhesion with the parts which they come in contact with prior to catalyzation and can provide a low density filler for unwanted voids in a manufactured article.

In the use of such two-component materials, however, it is difficult to achieve satisfactory mixing of the very fluid catalyst with the highly viscous putty-like component. It is believed that the lack of fluidity of the viscous putty-like material inhibits the entry of the very fluid catalyst into an intimate mixture. Applicators that have been in use have tried to introduce the low viscosity catalyst into a flow of high viscosity putty-like material through one or more orifices, frequently at the periphery of the flowing putty-like material, with less than satisfactory results.

BRIEF SUMMARY OF THE INVENTION

The invention provides improved mixing of a very viscous putty-like component with a very fluid, low viscosity catalyst component through the formation of a plurality of stream-like flows of the low viscosity catalyst over which the high viscosity putty-like component is divided into adjoining flows, each of the adjoining flows having been contiguous with and exposed to a flowing column of the low viscosity catalyst and carrying catalyst away on its surface in one of the plural flows. The plurality of flows of the viscous putty-like component, each carrying on its surface a film of the low viscosity catalyst, can be merged and more effectively mixed by static mixtures of the spiral mixer type for application and catalyzation.

Apparatus of the invention includes: an applicator; means for urging a first component in the form of a putty-like material to flow through the applicator; means for urging a second component in the form of a low viscosity catalyst through the applicator; and means for mixing the first and second components prior to their flow outwardly from the applicator, said mixing means comprising a flow divider element having a surface facing the flow of the first component, said facing surface having a plurality of open channels extending transversely across the surface, an aperture for introducing flows of the second component to the plurality of open channels, said flow divider further having a plurality of passageways for the first and second components, each of the plurality of passageways being located between an adjacent pair of the plurality of transversely extending channels, said mixing means further comprising means forming a single passageway in communication with said plurality of passageways and a static mixer in said passageway. Preferably, the flow divider has a centrally located passageway for introducing the second component centrally within the surface facing the flow of the first component and the plurality of open channels extend radially outwardly from the central passageway at equally spaced angles, and the plurality of passageways are located between the equally spaced radially extending channels.

The method of the invention includes: urging a viscous putty-like first component of a plural component material into a flowing mass; dividing a very fluid second component into a plurality of flows, each flow of the very fluid second component extending transversely of and being exposed to the flowing mass of the putty-like first component; forcing the flowing mass of the putty-like first component into a plurality of divided flows while exposed to the plurality of flows of the very fluid second component, said divided flows being spaced between the plurality of transverse flows of the very fluid second component; carrying the very fluid second component with the plurality of divided flows of the viscous putty-like first component as a result of the exposure of the very fluid second component to the plural flows of the viscous putty-like first component; and merging and further mixing the plurality of flows of the putty-like first component, which are carrying the very fluid second component.

Other features and advantages of the invention will be apparent from the drawings and more detailed description that follows.

DETAILED DESCRIPTION OF THE DRAWINGS

FIG. 2A is a front view of the upstream end of the mixing and distributing element;

FIG. 2C is a rear view of the downstream end of the mixing and distributing element;

FIG. 2B is cross-sectional view taken at the plane 2B—2B of FIG. 2C; and

FIGS. 3A and 3B are cross-sectional views of the mixing and distributing element including a catalyst check valve, with FIG. 3A showing the check valve closed and FIG. 3B showing the check valve open.

DETAILED DESCRIPTION OF THE INVENTION

Figure 1:
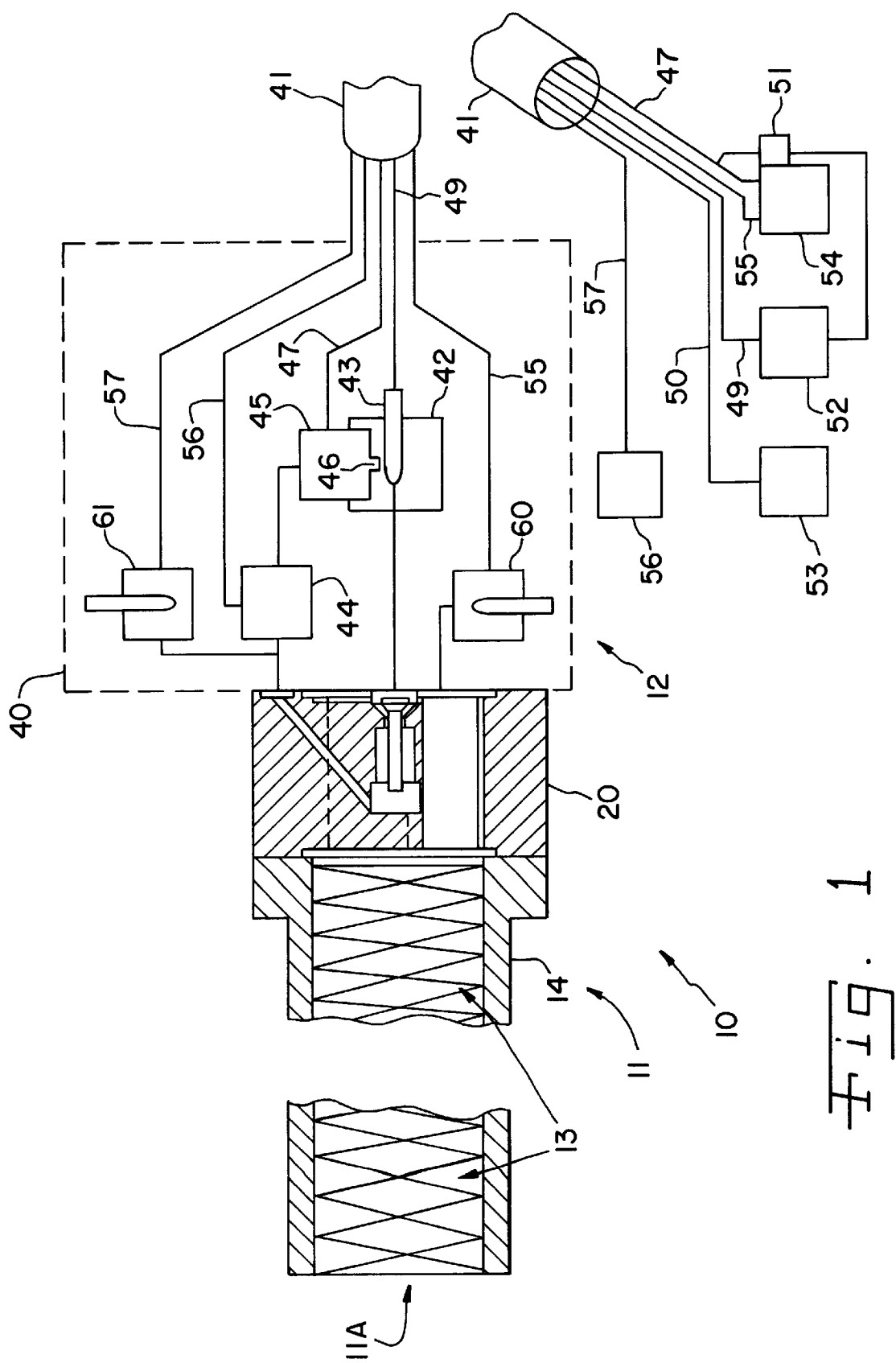
FIG. 1 is a diagrammatic drawing of apparatus of the invention.

As shown in FIG. 1, apparatus 10 of the invention includes an applicator 11 for applying mixed two-component putty-like adhesive/fillers, and means 12 for controlling the applicator 11 and manufacturing operations including the applicator 11. The applicator 11 comprises means for distributing and mixing a very fluid low viscosity catalyst into a high viscosity putty-like adhesive material. Where in this application I refer to very fluid or low viscosity materials, I am referring to fluids having viscosities less than about 1000 centipoise and as low as about 200 centipoise, and where I refer to high viscosity putty-like materials, I am referring to plastically deformable putty-like materials having viscosities of about 500,000 centipoise and greater, and typically over about one million centipoise. In the invention, the applicator 11 through its means 20 for distributing and mixing very fluid materials with high viscosity putty-like materials can provide a more uniform distribution of a very fluid catalyst material in the high viscosity putty-like adhesive material as described further below and more effective mixing by downstream static mixers 13.

The preferred means 12 for control and operation of the applicator includes a plurality of valves carried on a handle-like body to permit manipulation and control of the applicator 11. The handle-like assembly 40 carries the applicator at the end of a long flexible tubular assembly 41 so that various valve operators can be conveniently operated by the apparatus user. The handle-like control assembly 40 includes a bail valve 42 and ball valve operating handle 43 to control the flow of the high viscosity puttylike material. The assembly 40 also provides an air-operated valve 44 for control of the very fluid, low viscosity material such as a catalyst. The air operated control valve 44 is operated by a manually operated air valve 45 which is operated through an operating plunger 46 and operation of the handle 43 of the ball valve 42. Thus, when application of the catalyzed adhesive filler is desired, the apparatus user turns the control handle 43 from the position shown in FIG. 1, 90 degrees clockwise opening the ball valve 42 and the conduit 49 which carries the high viscosity putty-like material. The cam-like end of the handle 43 depresses the plunger 46, opening the air valve 45, permitting a flow of compressed air through air hose 47 and air valve 45 for operation of the catalyst air control valve 44, which opens the conduit 50 to a flow of low viscosity catalyst to the applicator 11. Air hose 47 is connected with a pressure sensing switch 51 which operates the pumps for both the high viscosity putty-like material (pump 52) and the very fluid low viscosity catalyst (pump 53), generating a flow of putty-like material through hose 49 and valve 42 to the applicator 11 and a flow of catalyst through the hose 50 and catalyst flow control valve 44 to the applicator 11 where the plural component materials are mixed and urged from the orifice 11a for application to, for example, articles of manufacture.

The apparatus also includes two features that can be used to prevent catalyzed materials from hardening within the applicator 11 when the system is flushed with a solvent. Valve 60 controls a flow of air at high pressure, for example, 50 to 60 psi, from a source of compressed air 54 through hose 55. Initially, when valve 60 is open, the high pressure air flow urges the bulk of the high viscosity putty-like material and low viscosity catalyst from the applicator 11. In addition, controlling the valve functions as a solvent valve for flushing the catalyst checkvalve, by the delivery of solvent from a pressurized solvent source 56 through hose 57 and into block 21 and passageways 28, 29 (more fully described below) and flushes the applicator 11 with solvent, reducing the build-up of individual components of the adhesive material and any catalyzed materials within the applicator 11, passageway 29 and checkvalve 33.

Figure 2C:
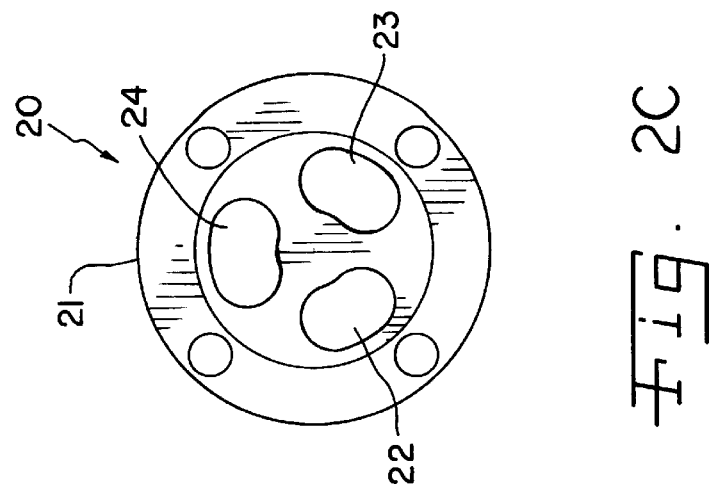
FIGS. 2A–2C are drawings of the mixing and distributing element of the invention.
Figure 2B:
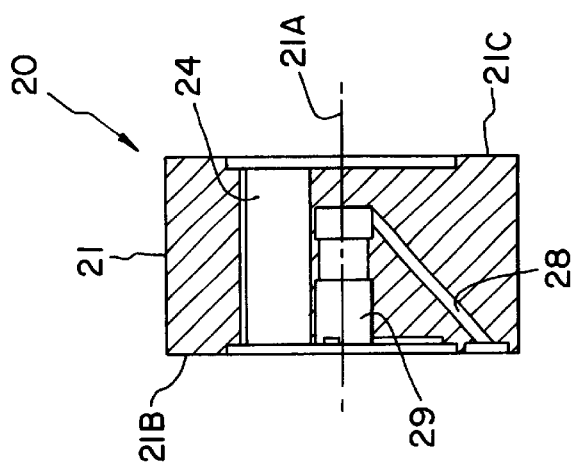
Figure 2A:
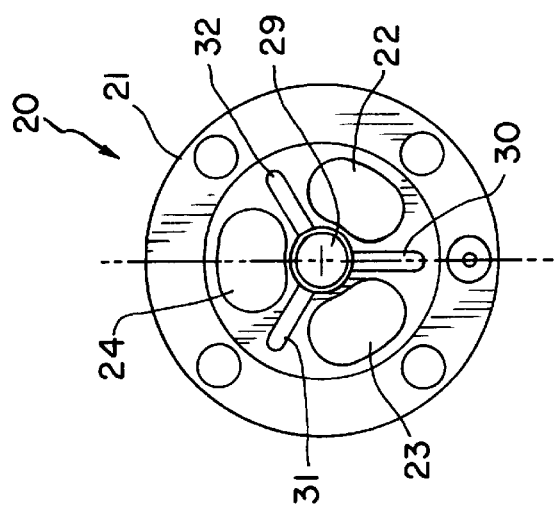

FIGS. 2A–2C and FIGS. 3A and 3B illustrate the means for distributing and mixing the very fluid, low viscosity catalyst with the high viscosity putty-like material. As shown in FIGS. 2 and 3 and described further below, the means 20 for distributing and mixing the low viscosity catalyst with a high viscosity component comprises a flow divider, which is conveniently, a cylindrically shaped block 21 of aluminum material. The block 21 has a first face 21b on its upstream side, that is, on the side attached to control means 12 (FIG. 2A) and the downstream side 21c (FIG. 2C) attached to the further mixing means 13 of the applicator means 11. The high viscosity putty-like material is divided into the plurality flow paths adjacent the upstream face 21b of the block 21. As shown in FIGS. 2A and 2C, the bock includes a plurality of passageways spaced about the central axis 21a of the block. In the preferred distributing and mixing means 21 of FIGS. 2A–2C, the plurality of passageways comprise three passageways 22, 23 and 24, spaced at 120 degrees, to divide the flow of the high viscosity putty-like material into three portions, one portion transiting each of the passageways 22, 23 and 24. The block 21 also includes a passageway 28 for the very fluid catalyst extending from the upstream face 21b of block 21 to a central passageway 29 coincident on the central axis 21a of block 21. The upstream face 21b of block 21 includes a plurality of open channels 30, 31, 32 extending radially outward between the passageways 22, 23, 24 and equiangularly separated at 120 degree intervals, according to the preferred embodiment, although a greater or lesser number of open channels separated by even or uneven angular intervals is contemplated by the present invention.

As shown in FIGS. 3A and 3B, the central passageway 29 includes a check valve 33 for controlling flow of the low viscosity catalyst material. In operation of the applicator means 11 when the catalyst control valve of 44 is open, the pressure of the catalyst from the pressurized catalyst source 53 opens the catalyst check valve as shown in FIG. 3B. Catalyst win flow from the upstream face 21b of the block 21 through passageway 28 to the central passageway 29 where the pressure of the catalyst lifts the catalyst check valve 33 as shown in FIG. 3B permitting catalyst to flow outwardly in a plurality of flow paths (FIG. 2A) located between each of the plurality of flow paths formed by the block 21 for the high viscosity putty-like material. The plurality of radially extending flow paths for the low viscosity catalyst material are formed by the plurality of radially extending open channels 30, 31 and 32 extending radially outwardly from the central passageway in an equally angularly spaced arrangement, as shown in FIG. 2A. When flushed with solvent from the pressurized solvent source 56, a build-up of catalyzed material is reduced or substantially eliminated within passageway 29, check valve 33 and applicator 11. This solvent flushing thus maintains flow and pressure parameters, while eliminating cross-contamination between flows comprised of different components.

Thus the means for distributing and mixing the low viscosity catalyst material with the high viscosity putty-like material divides the low viscosity material into a plurality of outwardly flowing, angularly spaced streams and divides the flow of putty-like material into a plurality of flows of putty-like material adjacent to and contiguous with the flowing streams of low viscosity catalyst material. Because of the relatively high viscosity of the putty-like high viscosity material, it flows in a substantial mass and provides, in essence, an upstream wall for tie plurality of open channels 30, 31, 32, and the low viscosity catalyst material is distributed from the plurality of open channels 30, 31, 32 onto the surface of the high viscosity putty-like material as it is divided and flows through the plurality of channels 22, 23 24.

Upon leaving the downstream face 21c of block 21, the plurality of streams of the high viscosity putty-like material with its distributed low viscosity catalyst are urged into single flow path by nozzle 14 having a length, preferably, of about 10 to 22 inches of spiral-type static mixers 13 of the type sold by Graco Company, of Minneapolis, Minn. 55440. The nozzle 14 has a length dependent on the combined viscosity of the two components to be mixed. Alternatively, the present invention contemplates the use of a nozzle having a 12–24 inch length for use with a variable mixer. The mixed plural component material can then be directed from the orifice 11a of the applicator 11 as desired by the equipment operator and applied to adhere adjacent parts and subassemblies and to fill selected voids of an assembly with the low density solid filter.

Conventional, two-component putty-like adhesive materials are advantageously applied with the invention.

The invention thus provides an apparatus 10 for applying a two-component putty-like material comprising a applicator 11, means 52 for urging a first high viscosity component of the putty-like material through the applicator 11, means 53 for urging a second low viscosity component of the putty-like through the applicator 11, and means 13, 20 for mixing the first and second components of the putty-like material prior to their flow outwardly from the applicator 11. In the invention, the applicator includes a distributing and mixing means 20 for the two components comprising a flow divider element 21 forming an outward surface 21b facing the flow of the high viscosity putty-like component and having a plurality of open channels 30, 31, 32 extending transversely across the surface 21b and a passageway 29 and aperture (or apertures) for introducing flows of the low viscosity component material to the plurality of open channels 30, 31, 32. The flow divider 21 further comprises a plurality of passageways 22, 23, 24, each of the plurality of passageways 22, 23, 24 being located between an adjacent pair of the plurality of transversely extending channels 30, 31, 32 so that the flow of the high viscosity putty-like first component can be urged against and flow over the low viscosity second component in the plurality of open channels and can carry away a distribution of the low viscosity second component material over the surface of the high viscosity putty-like first component material as it is urged into the plurality of passageways of the flow divider. Preferably the flow divider has a centrally located passageway for introducing the low viscosity second component centrally within the surface facing the flow of the high viscosity first component, and the plurality of open channels extend radially outwardly from the central passageway at equally spaced angles with the plurality of passageways being located between the equally spaced radially extending channels.

In operation, the invention provides a method for mixing two fluid materials by urging a first putty-like material to flow forwardly in a flow path, urging a second very fluid catalyst material to flow for mixing with the putty-like material, directing the second very fluid catalyst material for introduction centrally in the flow path of the first putty-like material, directing the very fluid catalyst material from centrally within the flow path of the high viscosity putty-like material transversely of said flow path in a plurality of flow paths extending radially outwardly with respect to the flow path of the high viscosity putty-like component, and urging the flow of putty-like material to divide adjacent the plurality of radially outwardly extending flow paths of the very fluid catalyst to distribute and carry the very fluid catalyst in a combined flow with the high viscosity putty-like material in a plurality of passageways, each of the plurality of passageways being located between two of the radially outwardly extending flow paths for the catalyst. In the method of the invention, the plurality of combined flows of high viscosity putty-like material carrying the very fluid catalyst material is recombined into a single flow path where the distributed catalyst is more uniformly mixed within the high viscosity putty-like material prior to its application to an article of manufacture.

This invention thus provides an apparatus and method for mixing and applying two components where there is a wide difference in the viscosities and fluidities of the two components. In the apparatus and method, a mixing/distributing element comprises a flow divider with a surface facing the flow of the higher viscosity component and having a plurality of open channels extending transversely across the surface and providing a plurality of flow paths for the lower viscosity component. The flow divider further provides a plurality of passageways for the combined flow of the two components, each of the plurality of passageways being located between adjacent open channels of the plurality of transversely extending channels and providing a division of the flow of the higher viscosity component adjacent the flowing lower viscosity component, whereby the lower viscosity component is distributed in the plurality of flow paths and passageways in the mixing/distributing element with the higher viscosity components. Upon exiting the mixing/distributing element, the plurality of flows of higher viscosity component with their distributed lower viscosity component are recombined and further mixed by static mixing to provide a more uniform mixture of the component.

While I have described and illustrated preferred embodiments of the invention, those skilled in the art will recognize that there are other embodiments that can incorporate the invention. Accordingly, the invention should be limited only by the scope of the claims that follow.

I claim:

1. A method of mixing two fluid materials, comprising the steps of:

urging a viscous material to flow forwardly through an applicator in a flow path along a longitudinal axis;

urging a catalyst material to flow through the applicator for mixing with the viscous material;

directing the catalyst material within the applicator for introduction centrally in the flow path of the viscous material, and dividing the catalyst material from centrally within said flow path into a discrete plurality of radially outward flow paths extending radially with respect to said axis; and directing the flow of viscous material at the plurality of radially outward flow paths of catalyst for mixing therewith, and dividing the flow of viscous material into a discrete plurality of flow paths that are contiguous with the radially outward flow paths of the catalyst and extend coaxially with respect to said axis, each of said plurality of flow paths being located between two of said radially outward flow paths of the catalyst.

2. The method of claim 1 wherein said plurality of radially outward catalyst flow paths comprise three equally spaced catalyst flow paths extending substantially perpendicular to the flow path of the viscous materials, said three equally spaced catalyst flow paths being exposed to the flow of viscous material.

3. The method of claim 1 wherein the viscous material has a viscosity in excess of about 500,000 centipoise and the catalyst has a viscosity of less than about 1,000 centipoise.

4. The method of claim 1, comprising the step of flowing a solvent through the applicator to flush flow residues from the applicator.

5. The method of claim 4, comprising the step of flowing the solvent through the applicator in the direction of the flow paths.

6. A method of mixing a viscous fluid material with a substantially less viscous fluid in an applicator comprising the steps of:

urging the viscous fluid to flow in a direction along a longitudinal axis;

dividing the less viscous fluid into a plurality of discretely divided flows extending radially with respect to said axis, each flow of the less viscous fluid extending transversely of the flow of the viscous fluid and being exposed to flowing viscous fluid;

forcing the viscous fluid into a plurality of discretely divided flows extending coaxially with respect to said axis and spaced between the plurality of transversely extending flows of less viscous fluid; and carrying the less viscous fluid with viscous fluid in the plurality of divided flows as a result of the exposure of the transversely extending flows of less viscous fluid to the flow of viscous material and the forced divided flows.

7. The method of claim 6, comprising the step of flowing a solvent through the applicator to flush flow residues from the applicator.

8. The method of claim 7, comprising the step of flowing the solvent through the applicator in the direction of the flow paths.

9. An apparatus for applying a two-component viscous material, comprising:

an applicator;

means for urging a first component of the viscous material to flow through the applicator;

means for urging a second component of the viscous material through the applicator; and means for mixing the first and second components prior to their flow outwardly from the applicator;

said mixing means comprising a flow divider element having an upstream surface facing the flow of the first component of the viscous material, said surface having a plurality of open channels extending transversely across the surface, a central passageway for introducing flows of the second component of the viscous material to the plurality of open channels, said flow divider further having a plurality of passageways for the first and second components of the viscous material arranged about the central passageway and extending from the upstream surface to a downstream surface of the flow divider, each of the plurality of passageways being located between an adjacent pair of the plurality of transversely extending channels, said mixing means further comprising means forming a single passageway from the downstream surface in communication with said plurality of passageways and a static mixer in said single passageway.

10. The apparatus of claim 9 wherein the flow divider has a centrally located passageway for introducing the second component centrally within the surface facing the flow of the first component and the plurality of open channels extend radially outwardly from the central passageway at equally spaced angles, and wherein the plurality of passageways are located between the equally spaced radially extending channels.

11. The apparatus of claim 9 wherein said applicator comprises a ball valve for the first component and a handle for operation of said ball valve, an air-operated valve for the second component, and an air control valve operated by said handle, said air valve controlling a flow of control air for operating the air operated valve for the second component, said control air providing a signal for operation of the means for urging said first component and means for urging said second component through the applicator.

12. The apparatus of claim 9, comprising means for urging a solvent through the mixing means.

13. A mixer for combining components of a two-component viscous material having a first viscous component and a second low viscosity component, comprising:

a mixer body having a first upstream face and a second downstream face and a longitudinal axis, and a first plurality of channels concentrically arranged about the longitudinal axis for flowing said first component of the viscous material from said first face to said second face of the mixer body, and a passageway extending to the first face and communicating with a second plurality of open channels formed in and extending traversely across the first face, for flowing said second low viscosity component of the viscous material into contact with a flow of said first component, said viscous first component being urged against the first upstream face and second low viscosity component and into the first plurality of channels.

14. The mixer of claim 13, wherein said first plurality of channels are equiangularly spaced about the axis and said second plurality of channels extend radially outward from said center channel to maximize mixing contact between the first component and the second component.

* * * * *